US005932275A

United States Patent [19]
Nalur

[11] Patent Number: 5,932,275
[45] Date of Patent: Aug. 3, 1999

[54] PALM KERNEL OIL BLENDS

[75] Inventor: Shantha C. Nalur, Dublin, Ohio

[73] Assignee: Nestec S.A., Vevey, Switzerland

[21] Appl. No.: 09/050,938

[22] Filed: Mar. 31, 1998

[51] Int. Cl.[6] ........................................... A23D 9/00
[52] U.S. Cl. .......................... 426/607; 426/606; 426/601; 426/660
[58] Field of Search ................................... 426/607, 606, 426/660, 601

[56]                References Cited

U.S. PATENT DOCUMENTS

| | | | |
|---|---|---|---|
| 4,208,445 | 6/1980 | Cottier et al. | 426/607 |
| 4,219,584 | 8/1980 | Mori et al. | 426/607 |
| 4,276,322 | 6/1981 | Padley et al. | 426/660 |
| 4,348,423 | 9/1982 | Pairaud et al. | 426/607 |
| 4,366,181 | 12/1982 | Dykshoorn | 426/603 |
| 4,430,350 | 2/1984 | Tresser | 426/101 |
| 4,465,703 | 8/1984 | Jasko et al. | 426/607 |
| 4,613,514 | 9/1986 | Maruzeni et al. | 426/607 |
| 4,705,692 | 11/1987 | Tanaka et al. | 426/607 |
| 4,711,788 | 12/1987 | Porcello et al. | 426/94 |
| 4,721,626 | 1/1988 | Rule | 426/601 |
| 4,873,109 | 10/1989 | Tanaka et al. | 426/607 |
| 4,902,527 | 2/1990 | Galenkamp et al. | 426/607 |
| 5,149,557 | 9/1992 | Morrison et al. | 426/570 |
| 5,324,533 | 6/1994 | Cain et al. | 426/607 |
| 5,431,948 | 7/1995 | Cain et al. | 426/607 |
| 5,554,408 | 9/1996 | Cain et al. | 426/607 |

OTHER PUBLICATIONS

Rita Leissner et al 1991 Cocoa Butter Alternatives Karlshamns Oils and Fats AB.

Minifie 1980 "Cocoa Butter and Replacement Fats" in Chocolate, Cocoa and Confectionery AVI Publishing Westpoint (pp. 67–88.

Swern 1979 Bailey's Industrial Oil and Fat Products vol. 1 4th edition John Wiley & Sons, New York pp. 317–322.

Berger, "Palm Oil Products: Why and How to Use Them," *Food Technology,* pp. 72–79, Sep., 1986.

Dallow, "The Title of This Paper Is the Question: Chocolate or Compound Coating?" *The Manufacturing Confectioner,* pp. 26–38, Feb., 1974.

Faulkner, "Cocoa Butter Equivalents Are Truly Specialty Vegetable Fats" *The Manufacturing Confectioner,* pp. 56–61, May, 1981.

McDonald et al., "Confectionery Fats—The Alternative Approach," *Confectionery Manufacture & Marketing,* pp. 5–6, Apr., 1982.

Ransom et al., "Mixed Fat Interactions in Palm Kernel Oil Based Coatings," abstract in *IFT Annual Meeting/Book of Abstracts,* p. 224 (1995).

Sessa, "Derivation of a Cocoa Butter Equivalent from Jojoba Transesterified Ester via a Differential Scanning Calorimetry Index," *J. Sci. Food Agric.,* 72, pp. 295–298 (1996).

Shukla, "Confectionery Fats," in *Developments in Oils and Fats,* pp. 67–94 (1995).

Traitler et al., "Palm Oil and Palm Kernel Oil in Food Products," *JAOCS,* 62(2), pp. 417–421 (1985).

Wilton et al., "Quick and Simple Method for Studying Crystallization Behavior of Fats," *JAOCS,* 40, pp. 707–711 (1963).

(no author) "Confectionery Fats—For Special Uses," *JAOS,* 61(3), pp. 468–472 (1984).

(no author) "Chocolate–Flavoured Compounds for Confectionery Coatings," *ZFL,* 44(4), pp. 64–66 (1993).

*Primary Examiner*—Carolyn Paden
*Attorney, Agent, or Firm*—Pennie & Edmonds LLP

[57]                ABSTRACT

The present invention provides oil blends suitable for use as cocoa butter substitutes. These oil blends are based on palm kernel oil and its derivatives, and include palm kernel oil, hydrogenated palm kernel oil, palm kernel stearin and hydrogenated palm kernel stearin. Also disclosed are edible food products such as confectionery products and chocolate alternative compositions made from these palm kernel oil blends.

20 Claims, 3 Drawing Sheets

PALM KERNEL OIL BLENDS

1. FIELD OF THE INVENTION

The present invention is directed to novel oil blends suitable for use in edible products. More specifically, the invention is directed to oil blends including palm kernel oil, hydrogenated palm kernel oil, palm kernel stearin and hydrogenated palm kernel stearin. The palm kernel oil blends of the present invention have flavor release and texture properties similar to those of cocoa butter. They are particularly useful as cocoa butter substitutes in edible food products such as confectionery products and chocolate alternative compositions.

2. BACKGROUND OF THE INVENTION

Cocoa butter is a widely used and much appreciated fat composition produced from cocoa beans. Cocoa butter is used for its flavor and texture properties in a variety of edible products, particularly in combination with sugars and other ingredients to make chocolate. The desirability of the characteristic cocoa butter flavor and texture have long assured a strong demand for cocoa butter and products which are made from cocoa butter. The worldwide cocoa bean supply, however, suffers from significant variability, due to constant and often unpredictable changes in the ability of different cocoa bean supplying regions to deliver enough beans at a consistent price and quality to meet the demand.

The uncertain availability of cocoa beans and the associated fluctuations in price have led to much effort to formulate alternative fat compositions which can be used in place of or in conjunction with natural cocoa butter. These alternative fats are generally classified into three types, based on their chemical composition and compatibility with cocoa butter. Cocoa butter equivalents (CBE) are fats which have chemical and physical properties compatible with cocoa butter, and can be used to supplement cocoa butter in confectionery products. Cocoa butter substitutes (CBS) are generally lauric fats which are incompatible with cocoa butter. Cocoa butter replacers (CBR) are partially compatible with cocoa butter. CBRs are primarily non-lauric fats which have properties intermediate those of CBEs and CBSs, and are sometimes referred to as non-lauric cocoa butter substitutes. Detailed discussions of these different types of alternative fats can be found in a variety of sources; see, for example, Traitler, H. et al., *Journal of the American Oil Chemists Society*, 62(2), 417–21 (1985); Shukla, V., in *Developments in Oils and Fats*, 66–94 (1995); Berger, K., *Food Technology*, 40(9), 72–79 (1986), the disclosures of which are incorporated herein by reference. Among these three principal types of alternative fats, cocoa butter equivalents are relatively more expensive, while cocoa butter substitutes are relatively less expensive. Typically, cocoa butter substitutes cost only one-third to one-fourth as much as cocoa butter, making products which use these alternative fats economically especially attractive to consumers.

One particular area in which cocoa butter substitutes are widely used is in compound coatings for confectionery products. In fact, most of the compound coatings now used in commercial confectionery are made of these cocoa butter substitutes. Cocoa butter substitutes are often characterized as "lauric" or "non-lauric", depending on the chemical nature of the component fats. Most lauric cocoa butter substitutes are based on palm kernel oils. Oil industry suppliers subject palm kernel oils to several processing and modifying steps, such as fractionation, hydrogenation and interesterification, and these fractions and derivatives are further blended together in various proportions to produce cocoa butter substitutes with different properties. Examples of commercial suppliers of these fats are Fuji Vegetable Oil Inc., Aarhus Inc., and Loders and Croklaan. These various fats show differences in flavor, texture, bloom stability and processing characteristics.

Cocoa butter is particularly desirable in part because of its unusual melting characteristics. Cocoa butter is a solid at temperatures close to room temperature, but rapidly melts at body temperatures. Thus, unlike most oils or fats, cocoa butter maintains its solid shape at room temperature, around 20° C., but quickly melts as it is warmed in the mouth to temperatures above 30° C. As a result, cocoa butter has a unique and desirable texture and feel in the mouth, which contribute to its wide demand.

Recognizing that the melting characteristics of cocoa butter are desirable, much work has been done to mimic these melting characteristics in substitute fat compositions. Thus, oils can be chemically modified, such as by hydrogenation or interesterification, to modify their melting characteristics and hence increase their similarity to cocoa butter.

For example, U.S. Pat. No. 4,902,527 to Galenkamp et al. describes lauric fats which are selectively hydrogenated to provide a trans acid content of at least 25%. These modified fats reportedly show melting and other characteristics resembling those of coconut stearin, a high quality cocoa butter substitute.

Alternatively, oils can be chemically modified so that their triglyceride composition more closely matches that of cocoa butter. Cocoa butter is composed largely of 1,3-disaturated-2-unsaturated triglycerides. Thus, a number of U.S. patents attempt to provide cocoa butter substitutes by controlling the triglyceride composition of the component fats. For example, U.S. Pat. No. 4,873,109 to Tanaka et al. discloses cocoa butter substitute compositions containing at least 80% 1,3-disaturated-2-oleoyl glycerols which are up to 10% 1,3-dipalmitoyl-2-oleoyl glycerol, 25–45% 1-palmitoyl-2-oleoyl-3-stearoyl glycerol, and 45–70% 1,3-distearoyl-2-oleoyl glycerol.

Other workers have tried to provide cocoa butter substitutes by blending different oils to produce an oil composition with the desired properties. U.S. Pat. No. 4,430,350 to Tressler describes coatings for frozen confections containing an oil blend which can include palm kernel oil. The oil blend contains an interesterified mixture of 75–90% lauric acid or oil (including palm kernel oil) and 10–25% non-lauric oil. Coatings made with these oil blends reportedly show good brittleness, flavor and mouth-feel properties.

U.S. Pat. No. 4,613,514 to Maruzeni et al. discloses a cocoa butter substitute composition obtained by removing as completely as possible the high melting point fraction of a palm oil. The composition thus contains a medium melting point palm oil fraction which, because of the lack of a high melting point component, shows very sharp melting characteristics.

None of these references, however, provides an oil blend of palm kernel oil, hydrogenated palm kernel oil, palm kernel stearin and hydrogenated palm kernel stearin, which is suitable for use as a cocoa butter substitute, well-characterized, and possesses the flavor and texture release properties of cocoa butter.

3. SUMMARY OF THE INVENTION

The present invention is directed to edible blends of palm kernel oil. The invention is based on the surprising discovery that certain palm kernel oil blends have flavor release and texture properties similar to those of cocoa butter, despite being significantly different from cocoa butter in solid fat content and melting characteristics.

The oil blends of the invention are based on palm kernel oil as well as several well-known palm kernel oil derivatives. These derivatives include hydrogenated palm kernel oil, palm kernel stearin, and hydrogenated palm kernel stearin. Thus, an oil blend in accordance with the invention includes about 10 to about 16% by weight of palm kernel oil, about 6 to about 12% by weight of hydrogenated palm kernel oil, about 55 to about 75% by weight of palm kernel stearin, and about 7 to about 13% by weight of hydrogenated palm kernel stearin.

Another aspect of the invention relates to edible food products which include the palm kernel oil and palm kernel derivative oil blends. The edible food product may be, for example, a confectionery center, a confectionery coating, an ice cream coating, a bar, a morsel or a creamer.

In still another aspect of the invention is provided a chocolate alternative composition including the palm kernel oil blends of the invention. In this aspect, a chocolate alternative composition of the invention may also include cocoa powder, milk powder, sugars, emulsifiers, and other components suitable for use in chocolate alternatives.

The palm kernel oil blends of the invention, and edible food products and chocolate alternatives including these palm kernel oil blends, provides a reliable source of appropriate confectionery fats that does not suffer from the variability in availability and in price associated with cocoa beans. Further and surprisingly, these palm kernel oil blends offer alternatives to cocoa butter which possess highly desirable flavor and texture release properties similar to cocoa butter, despite differing from cocoa butter in solid fat content and melting characteristics.

Still other aspects of the invention will become readily apparent to those skilled in the art from the following detailed description.

4. BRIEF DESCRIPTION OF THE FIGURES

5. DETAILED DESCRIPTION OF THE INVENTION

Figure 1:
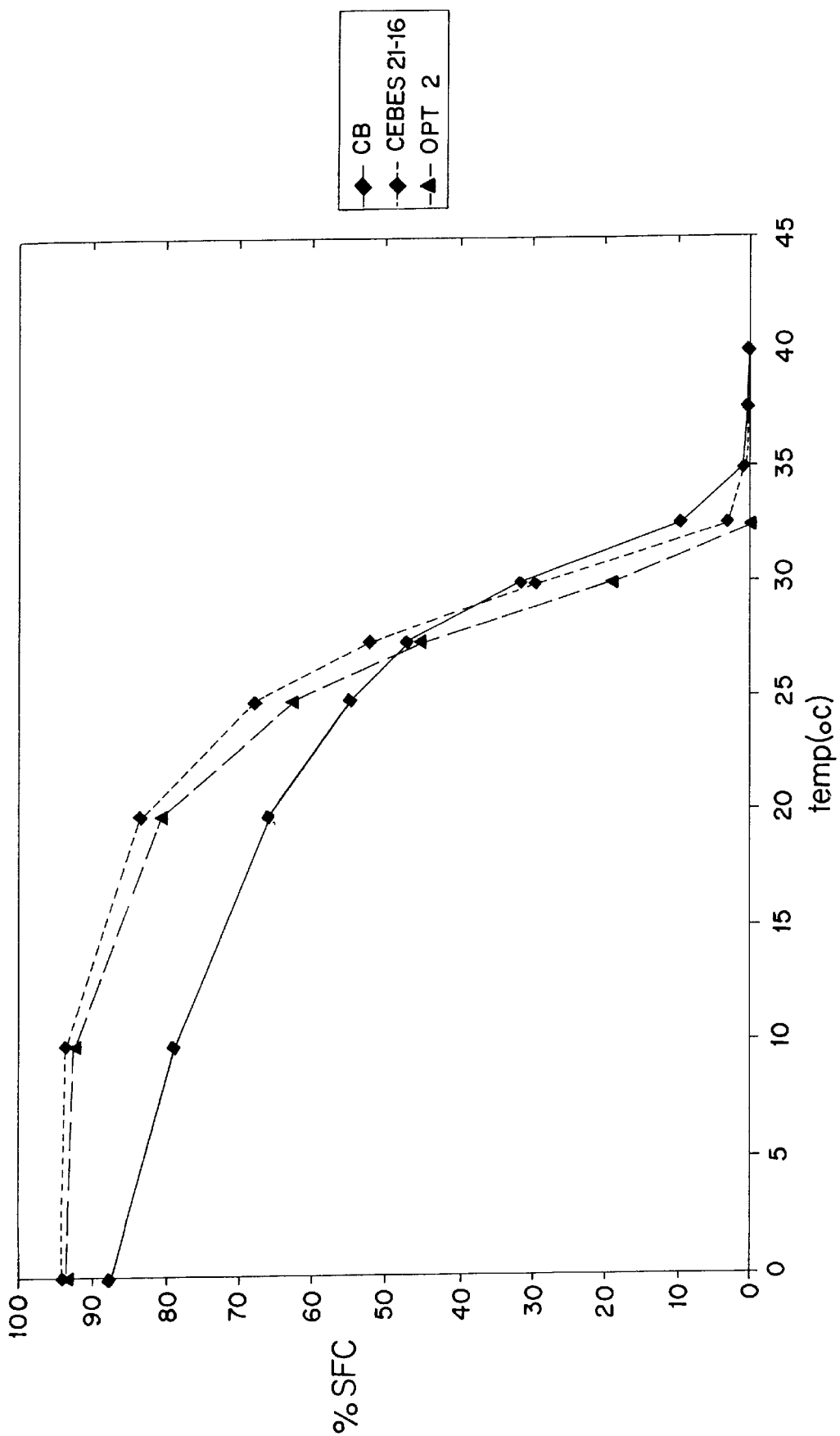
FIG. 1 is a graph comparing the solid fat content of a palm kernel oil blend of the invention to cocoa butter and to a commercially available oil blend.

In one embodiment, the present invention relates to palm kernel oil blends having flavor release and texture properties similar to those of cocoa butter. The oil blends include mixtures of palm kernel oil and modified or derivatized palm kernel oils. In particular, the palm kernel oil blends include palm kernel oil, hydrogenated palm kernel oil, palm kernel stearin, and hydrogenated palm kernel stearin. It has been surprisingly found that oil blends including these four components in particular weight percentages provide fat compositions having highly desirable flavor and texture properties similar to cocoa butter.

The palm kernel oil blends of the present invention include about 10 to about 16% by weight of palm kernel oil, about 6 to about 12% by weight of hydrogenated palm kernel oil, about 55 to about 75% by weight of palm kernel stearin, and about 7 to about 13% by weight of hydrogenated palm kernel stearin. These palm kernel oil components individually are well known and are commercially available from various sources, such as Fuji Vegetable Oil Inc., Aarhus Inc., and Loders and Croklaan.

The various oil components of the palm kernel oil blends are miscible. Thus, an oil blend of the present invention can be produced by simple mixing of the components in the proper weight ratios. Preferably, in order to more easily obtain a homogeneous blend, the components are melted and stirred together.

In a preferred embodiment, an oil blend of the present invention includes 12 to 14% by weight of palm kernel oil, 8 to 10% by weight of hydrogenated palm kernel oil, 60 to 70% by weight of palm kernel stearin, and 9 to 11% by weight of hydrogenated palm kernel stearin. In a most preferred embodiment, an oil blend includes 13.8% palm kernel oil, 9.4% hydrogenated palm kernel oil, 66.5% palm kernel stearin, and 10.3% hydrogenated palm kernel stearin.

The palm kernel oil blends of the present invention possess highly desirable texture and flavor properties. Thus, in another embodiment, the invention relates to edible food products which include these palm kernel oil blends. The edible food products including the palm kernel oil blends are not particularly limited. The food product may be, for example, a confectionery center, a confectionery coating, an ice cream coating, a bar, a morsel, a creamer or the like.

In this embodiment, the food product contains a palm kernel oil blend, the oil blend including by weight: about 10 to about 16%, preferably 12 to 14% and most preferably 13.8% palm kernel oil; about 6 to about 12%, preferably 8 to 10% and most preferably 9.4% hydrogenated palm kernel oil; about 55 to about 75%, preferably 60 to 70% and most preferably 66.5% palm kernel stearin; and about 7 to about 13%, preferably 9 to 11% and most preferably 10.3% hydrogenated palm kernel stearin.

In still another embodiment, the present invention is directed to a chocolate alternative composition containing the palm kernel oil blends of the invention. The chocolate alternative compositions of the present invention include about 24 to about 33% and preferably 25 to 30% by weight of a fat component which is a palm kernel oil blend. The palm kernel oil blend can be any of the palm kernel oil blends described herein. Other components which are preferably contained in the chocolate alternative composition are those which are well known in the art. These additional components include, for example, cocoa powder, various sugars or sugar substitutes, milk powder, emulsifiers, and other components known to one of skill in the art, such as stabilizers, preservatives, flavoring and coloring agents, and the like. Particular examples of chocolate alternative compositions according to the invention are given in the Examples.

Thus, a chocolate alternative composition of the present invention includes, by weight: about 24 to about 33%, preferably about 25 to 30%, of the palm kernel oil blends described above; about 30 to about 60% sugars; about 2 to about 25% cocoa powder; about 1 to about 20% milk solids; and optionally up to about 0.5% of an emulsifier.

Within these approximate ranges, preferred amounts and specifically preferred components vary with the nature of the chocolate alternative desired, and are readily determined by one skilled in the art. For example, the specific sugars chosen, and the amount of sugar used, are readily determined by the desired taste and texture of the product. For typical compound coating applications, a preferred sugar is sucrose. The cocoa powder can have from 0 to about 15%, and preferably no more than about 10 or 12%, fat content. At higher fat amounts, the ingredient mixture may undesirably soften. Similarly, the milk powder can be non-fat milk powder, full-fat milk powder, or anything in between, depending on the taste and texture desired. The emulsifier can be any emulsifier suitable for use in food products, and these are well known in the art. For example, typical emulsifiers suitable for use in the chocolate alternative compositions of the present invention include lecithin, polyglycerol polyricineolate (PGPR), sorbitan monostearate (SMS), polysorbate 60, sorbitan tristearate (STS), lactic acid esters (LAE), distilled monoglycerides (DMG), monodiglyceride (MDG), diacetyl tartaric acid esters of monodiglycerides (DATEM), and commercially-available emulsifier blends, such as BETTRFLOW™, a blend of monosodium phosphate derivatives of mono- and diglycerides. Mixtures of these emulsifiers are suitable as well. A preferred emulsifier is lecithin. Various other ingredients and additives well known to one skilled in the art can also be added, as desired.

Thus, the invention described herein encompasses palm kernel oil blends, edible food products containing the palm kernel blends, and chocolate alternative compositions made therefrom. The palm kernel oil blends of the present invention, and the products made from them, provide highly desirable flavor and texture release properties similar to those of cocoa butter.

Certain embodiments and features of the invention are illustrated, and not limited, by the following working examples.

6. EXAMPLES

6.1. Example 1: Solid Fat Content Comparison

The solid fat content of several fat compositions was measured using a pulsed NMR (Oxford QP[20]). The procedure used conformed to the American Oil Chemists Society (AOCS) method Cd 16b-93. Cocoa butter was tempered as described in the AOCS method, prior to testing. Since the other fat compositions tested were considered to be non-polymorphic fats, these compositions were not tempered.

The compositions tested were cocoa butter, Cebes 21-16, and a preferred palm kernel oil blend of the present invention. Solid fat content was measured at 0, 10, 20, 25, 27.5, 30, 32.5, 35, 37.5 and 40° C. Once the solid fat content for a particular composition reached 0, no further measurements were made for that composition at higher temperatures. The solid fat content at each temperature is reported in Table 1.

TABLE 1

| | Solid Fat Content | | |
|---|---|---|---|
| T (° C.) | Cocoa Butter | CEBES 21-16[a] | PKO Blend |
| 0.0 | 87.5 | 94.1 | 93.7 |
| 10.0 | 78.8 | 93.4 | 80.5 |
| 20.0 | 66.0 | 83.3 | 80.5 |
| 25.0 | 54.8 | 68.0 | 62.8 |
| 27.5 | 47.2 | 52.2 | 45.2 |
| 30.0 | 31.6 | 30.0 | 19.2 |
| 32.5 | 9.5 | 3.1 | 0 |
| 35.0 | 1.0 | 0.8 | |
| 37.5 | 0.4 | 0 | |
| 40.0 | 0 | | |

[a]available from Aarhus, Inc.

In the Table, CEBES 21-16 is a common commercially available lauric fat which contains up to about 90% palm kernel stearin. The PKO Blend in the Table is a preferred blend of 13.8% palm kernel oil, 9.4% hydrogenated palm kernel oil, 66.5% palm kernel stearin and 10.3% hydrogenated palm kernel stearin. As shown in the Table, the PKO blend has a higher solid fat content than cocoa butter at temperatures up to 25° C., and a lower solid fat content thereafter.

The data presented in the Table are also shown graphically in FIG. 1. FIG. 1 clearly shows that the solid fat content of the PKO blend differs from that of cocoa butter in both the lower and the higher temperature regions. In fact, the commercial blend CEBES 21-16 appears to match the solid fat content profile of cocoa butter more closely at temperatures above 25° C. than does the PKO blend. These results illustrate the surprising and unexpected finding that the PKO blend exhibited texture and flavor release properties similar to those of cocoa butter, despite the different solid fat content profiles.

6.2. Example 2: Cooling Characteristics

The properties of the PKO blends of the present invention were further investigated by measuring Shukoff curves. The Shukoff method is used to determine the cooling curves of fats. The procedure is based on the principle that phase transitions are accompanied by thermal changes. In a typical experiment, a sample of a fat or fat blend is heated to a temperature above its melting point range, so that all of the sample is in the liquid state. If necessary, the sample is filtered to give a clear, non-cloudy liquid. The sample is then immersed in a bath of uniform temperature, such as an ice bath enclosed in an insulated flask. The sample is then allowed to cool, and the temperature is recorded at uniform intervals. The Shukoff curve is a plot of temperature versus time as the sample cools.

In a pure, ideal sample that undergoes no phase changes within the measured temperature range, the cooling curve show follow an exponential decay. As the sample cools, the surrounding bath absorbs the heat released by the sample. Since the cooling rate is proportional to the temperature difference between the sample and the bath, it is convenient to keep the bath temperature constant to simplify data analysis and to enable reproducible and comparative results to be obtained.

A sample of liquid soybean oil is typically used to approximate the behavior of a simple, ideal system. This sample is used as a reference. In a pure, ideal, single-component sample that undergoes a single phase change (i.e., solidification) in the measured range, the temperature would fall until the phase change temperature is reached, remain constant while the phase change occurs, then continue falling after the phase change is complete; i.e., the cooling curve would show a plateau.

In practice, real systems show much more complex behavior, due to such factors as imperfect heat transfer, multiple crystalline phases, supercooling and the presence of complex mixtures of different fat components. Many cooling curves, in fact, show distinct minima, as the heat released by a crystallizing component is initially absorbed by the remainder of the sample that is not undergoing a phase change at that temperature, rather than by the surrounding bath. As a result, cooling curves are highly distinct for different fat mixtures, and can serve as a "fingerprint" for different systems.

The cooling characteristics of several fat blends were measured, using the International Union of Pure and Applied Chemistry (IUPAC) method. The Shukoff tubes were custom made by a glass blower. Each of the tubes was standardized before the samples were tested, to eliminate differences caused by different heat transfer characteristics of the tubes. The standardization procedure was as follows. Each tube was filled (by weight) with approximately 30 mL of refined, un-oxidized soybean oil, then heated at 60° C. for one hour. The tubes were then introduced into an ice bath (temperature 0±0.5° C.). The temperature of the sample in each tube was recorded every 30 seconds, using a Datatrace data logger, and plotted against time. No significant difference in the cooling curves was observed for the different sample tubes.

Figure 2:
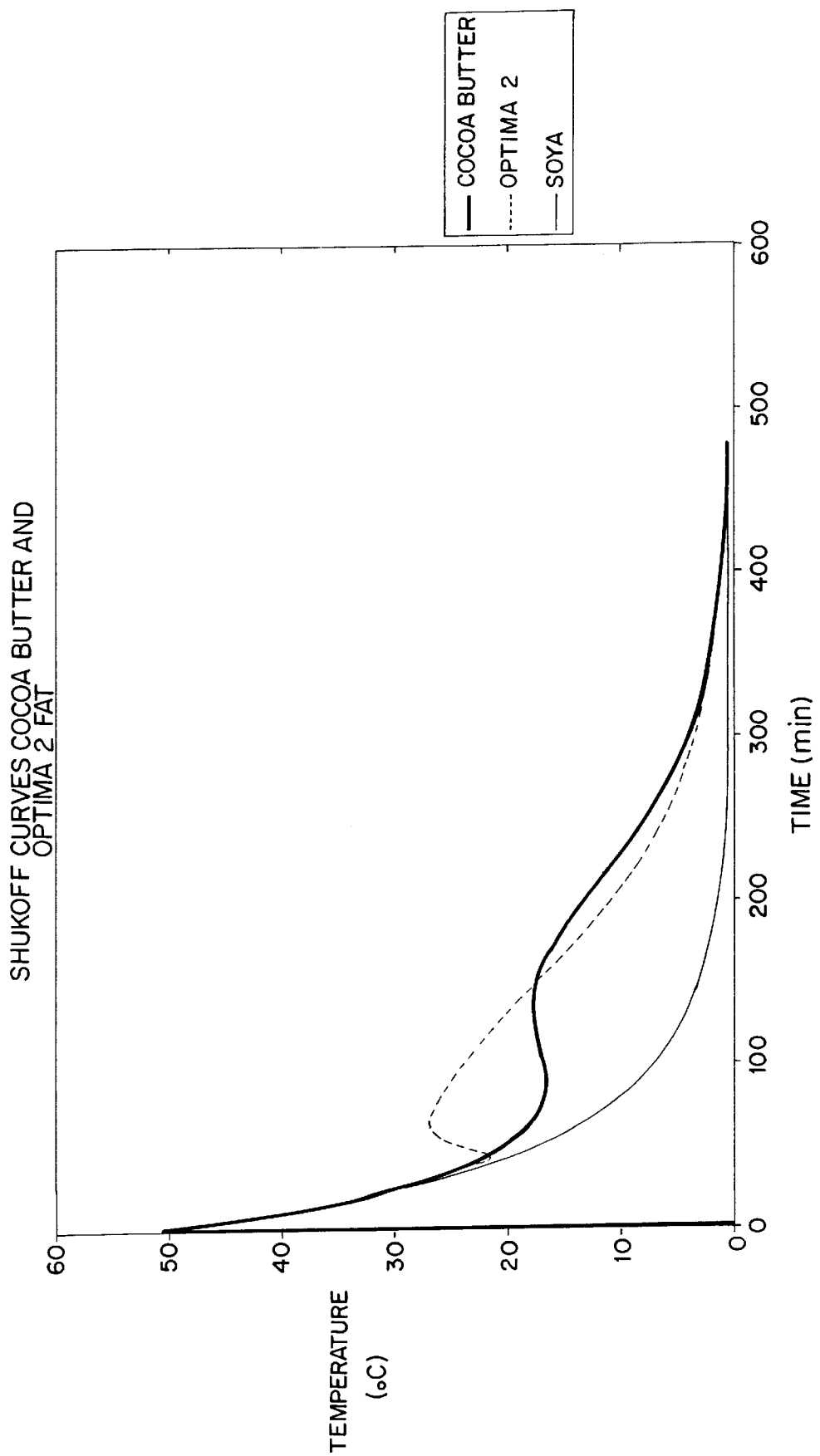
FIG. 2 is a graph comparing the Shukoff cooling curve of a palm kernel oil blend to that of cocoa butter.

Samples of the cocoa butter and a PKO blend of the present invention were melted completely and filtered, if necessary, to get rid of any solid fraction. Each sample was run alongside a soybean reference sample, to ensure the integrity of the data. FIG. 2 shows the Shukoff cooling curves for cocoa butter and a PKO Blend of 13.8% palm kernel oil, 9.4% hydrogenated palm kernel oil, 66.5% palm kernel stearin and 10.3% hydrogenated palm kernel stearin, with the cooling curve of soybean oil included as a reference.

From the Shukoff cooling curves, the following values were determined:

Prime Stay Temperature ($T_{prime}$): the temperature at which the sample and the soybean oil reference curve begin to diverge. This temperature corresponds to the temperature at which components in the sample begin to crystallize.

Minimum ($T_{min}$) and maximum ($T_{max}$) temperatures: following $T_{prime}$, the cooling curve of most fats shows a minimum followed by a maximum. The temperatures at the minimum and maximum in the cooling curve are $T_{min}$ and $T_{max}$, respectively. The temperature difference between $T_{min}$ and $T_{max}$, and the time difference between these two temperatures, were also determined. The data are summarized in Table 2.

TABLE 2

Shukoff Cooling Characteristics

| Sample | $T_{prime}$ (° C.) | $T_{min}$ (° C.) | $T_{max}$ (° C.) | Δ T | Δtime (min) |
|---|---|---|---|---|---|
| PKO Blend | 45.3 | 22.1 | 26.8 | 4.7 | 9.0 |
| Cocoa Butter | 45.6 | 16.4 | 17.6 | 1.2 | 21.5 |

As shown in the Table and in FIG. 2, the PKO blend begins to crystallize at about the same temperature as cocoa butter, 45.3° and 45.6° C., respectively. The PKO blend, however, has a minimum and a maximum at temperatures considerably higher than the corresponding minimum and maximum for cocoa butter. In addition, the temperature difference between $T_{min}$ and $T_{max}$ for the PKO blend is quite large, 4.7° C., compared to the corresponding temperature difference for cocoa butter, 1.2° C. In fact, in contrast to the distinct minimum and maximum of the PKO blend, cocoa butter shows a broad and indistinct phase transition region which is very nearly a true plateau. These results illustrate the surprising finding that the PKO blend exhibits texture and flavor release properties similar to those of cocoa butter, despite the different cooling characteristics.

6.3. Example 3: Texture Measurement of Chocolate Alternative made with PKO Blend In this Example, texture measurements were made for a chocolate alternative made using the PKO blend described in Example 1. The measurements were made with a TA-XT2 texture analyzer equipped with XTRAD software. A chocolate alternative was prepared from the following ingredients (% by weight):

| | |
|---|---|
| Sucrose | 49.8% |
| Non-fat dry milk | 14.6 |
| Cocoa (10–12% fat) | 5.1 |
| PKO Blend | 30.3 |
| Lecithin | 0.2 |

The texture of the PKO-based chocolate alternative was compared to the texture of two representative chocolates, A-194 (Nestlé) and German chocolate (Red Label Nestle). Each sample was formed into pieces of dimension 37×19×6 mm by melting the sample and cooling it in a mold. These pieces were then supported on a hollow testing surface. A 2 mm diameter punch probe (TA-52) was used for the test. A pre-test speed of 5mm/s, followed by a test speed of 1 mm/s was used. The probe penetrated to a depth of 5 mm, with a force threshold of 0.05 N, and returned to its original position at a rate of 10 mm/s.

Figure 3:
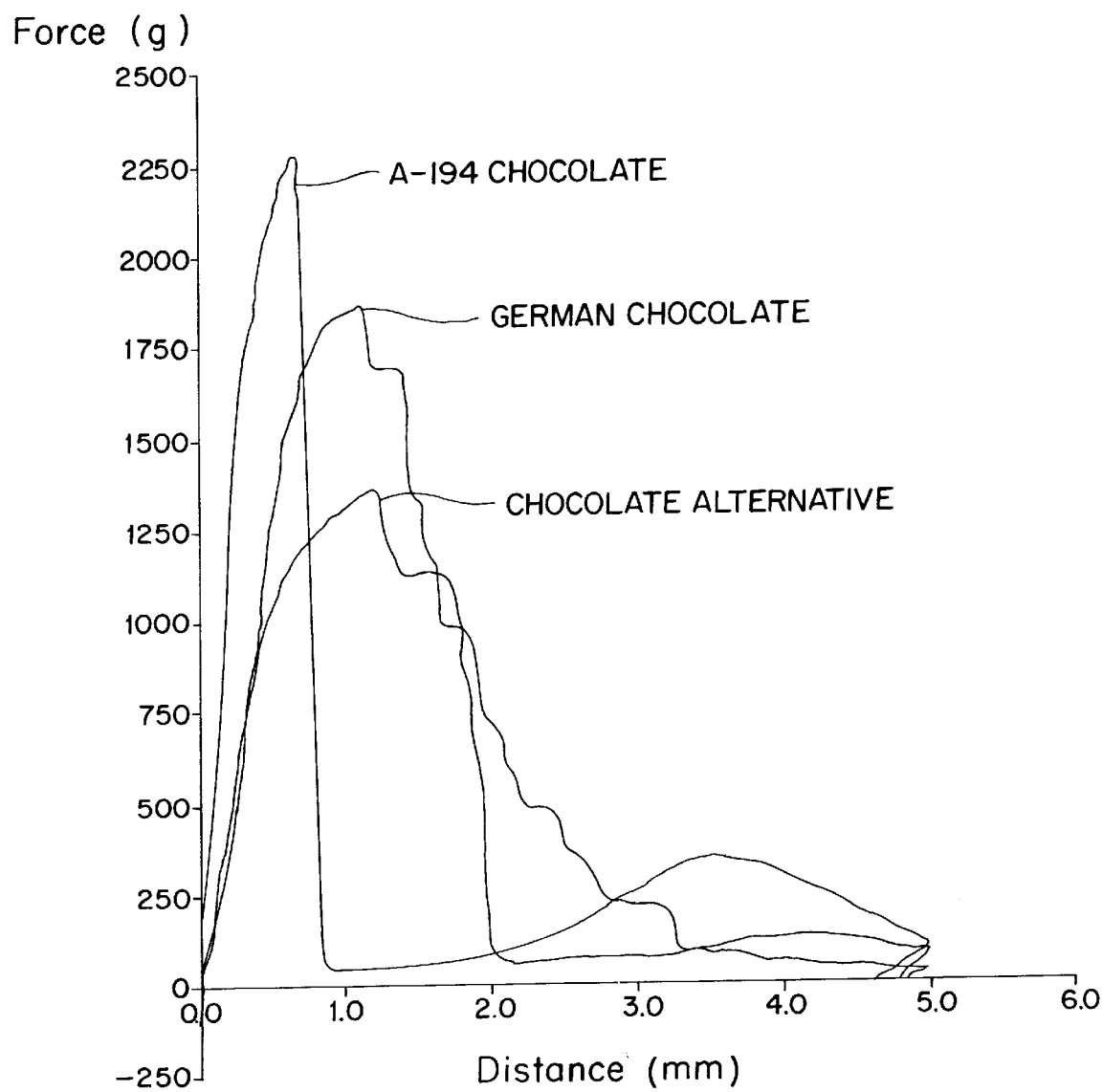
FIG. 3 is a graph comparing the texture of a chocolate alternative made with a palm kernel oil blend of the invention and chocolates.

FIG. 3 shows force (in grams) versus time for the three samples. Each data curve is the average of ten measurements. In the Figure, greater peak height, or greater force, corresponds to a harder composition. The Figure clearly shows that both the A-194 and German chocolates are considerably harder than the chocolate alternative made with the PKO blend. The width of a peak, or the time corresponding to the peak width at a particular force value, corresponds to the brittleness or flexibility of the composition. A short time, or a narrow peak, indicates a relatively brittle composition, since the sample breaks easily during the analysis. Conversely, a long time, or a broad peak, indicates a relatively flexible composition, since the sample more easily bends or flexes before breaking or cracking. As can be seen in the Figure, both the A-194 and German chocolates are much more brittle than the PKO-based chocolate alternative.

Table 3 shows the average hardness and brittleness measurements for each of the three samples. The data in the Table correspond to the measurements shown in FIG. 3 using a different averaging procedure. The peak widths listed in the Table were measured at a force of 200 g. Due to the differences in the averaging procedures, the peak widths in the Table are all somewhat smaller than the graph shows. The error bars give the standard deviation of the ten measurements.

TABLE 3

Texture Measurements for Chocolate and PKO-Based Chocolate Alternative

| Sample | Max. Force (g) | Peak Width (s) |
|---|---|---|
| Chocolate A-194 | 2312 ± 88 | 0.74 ± 0.05 |
| German Chocolate | 1946 ± 47 | 1.12 ± 0.24 |
| PKO-Based Chocolate Alternative | 1420 ± 55 | 1.94 ± 0.49 |

As the data show, the PKO-based chocolate alternative is about 40% and 30% softer than the A-194 and German chocolates, respectively. In addition, the PKO-based chocolate alternative is 160% and 70% more flexible than the A-194 and German chocolate samples. This combination of a soft and flexible texture makes PKO-based chocolate alternatives particularly useful in, for example, confectionery coatings, where a decreased tendency to crack or fracture are especially desirable.

6.4. Example 4: Chocolate Alternative made with PKO Blend

A chocolate alternative was made using a PKO blend of 13.8% palm kernel oil, 9.4% hydrogenated palm kernel oil, 66.5% palm kernel stearin and 10.3% hydrogenated palm kernel stearin. The composition of the chocolate alternative was as follows (% by weight):

| | |
|---|---|
| Sucrose | 49.8 |
| Mon-Fat Dry Milk | 14.6 |
| Cocoa (10–12% fat) | 5.1 |
| PKO blend | 30.3 |
| Lecithin | 0.2 |

6.5. Example 5: Chocolate Alternative made with PKO Blend

A chocolate alternative was made using a PKO blend of 13.8% palm kernel oil, 9.4% hydrogenated palm kernel oil, 66.5% palm kernel stearin and 10.3% hydrogenated palm kernel stearin. The composition of the chocolate alternative was as follows (% by weight):

| | |
|---|---|
| Sucrose | 53.5 |
| Cocoa (0% fat) | 17.7 |
| PKO blend | 28.7 |
| Lecithin | 0.1 |

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

All references cited in the present application are incorporated by reference in their entirety.

What is claimed is:

1. An oil blend comprising about 10 to about 16% by weight of palm kernel oil, about 6 to about 12% by weight of hydrogenated palm kernel oil, about 55 to about 75% by weight of palm kernel stearin, and about 7 to about 13% by weight of hydrogenated palm kernel stearin.

2. The oil blend of claim 1 which comprises 12 to 14% by weight of palm kernel oil, 8 to 10% by weight of hydrogenated palm kernel oil, 60 to 70% by weight of palm kernel stearin, and 9 to 11% by weight of hydrogenated palm kernel stearin.

3. The oil blend of claim 2 which comprises 13.8% by weight of palm kernel oil, 9.4% by weight of hydrogenated palm kernel oil, 66.5% by weight of palm kernel stearin, and 10.3% by weight of hydrogenated palm kernel stearin.

4. An edible food product which comprises an oil blend comprising about 10 to about 16% by weight of palm kernel oil, about 6 to about 12% by weight of hydrogenated palm kernel oil, about 55 to about 75% by weight of palm kernel stearin, and about 7 to about 13% by weight of hydrogenated palm kernel stearin.

5. The edible food product of claim 4 wherein the oil blend comprises 12 to 14% by weight of palm kernel oil, 8 to 10% by weight of hydrogenated palm kernel oil, 60 to 70% by weight of palm kernel stearin, and 9 to 11% by weight of hydrogenated palm kernel stearin.

6. The edible food product of claim 4 which is a confectionery center, a confectionery coating, an ice cream coating, a bar, a morsel or a creamer.

7. A chocolate alternative composition comprising cocoa powder and an oil blend, wherein the oil blend comprises about 10 to about 16% by weight of palm kernel oil, about 6 to about 12% by weight of hydrogenated palm kernel oil, about 55 to about 75% by weight of palm kernel stearin, and about 7 to about 13% by weight of hydrogenated palm kernel stearin.

8. The chocolate alternative composition of claim 7 comprising about 24 to about 33% by weight of the oil blend.

9. The chocolate alternative composition of claim 8 comprising 25 to 30% by weight of the oil blend.

10. The chocolate alternative composition of claim 7 wherein the cocoa powder has a fat content of 0 to 15%, and is present in an amount of about 2 to about 25% by weight of the composition.

11. The chocolate alternative composition of claim 7 further comprising a sugar.

12. The chocolate alternative composition of claim 11 wherein the sugar is present in an amount of about 30 to about 60% by weight of the composition.

13. The chocolate alternative composition of claim 7 further comprising milk powder.

14. The chocolate alternative composition of claim 13 wherein the milk powder is present in an amount of about 1 to about 20% by weight of the composition.

15. The chocolate alternative composition of claim 7 further comprising an emulsifier.

16. The chocolate alternative composition of claim 15 wherein the emulsifier is present in an amount of from about 0.01 to about 0.5% by weight of the composition.

17. A chocolate alternative composition comprising by weight:

about 24 to about 33 percent by weight of an oil blend, wherein the oil blend comprises about 10 to about 16% by weight of palm kernel oil, about 6 to about 12% by weight of hydrogenated palm kernel oil, about 55 to about 75% by weight of palm kernel stearin, and about 7 to about 13% by weight of hydrogenated palm kernel stearin;

about 30 to about 60% sugar;

about 2 to about 25% cocoa powder; and 1 to about 20% milk powder.

18. The chocolate alternative composition of claim 17 further comprising about 0.01 to about 0.5% of an emulsifier.

19. An edible food product comprising the chocolate alternative composition of claim 17.

20. The edible food product of claim 19 which is a confectionery center, a confectionery coating, an ice cream coating, a bar, a morsel or a creamer.

* * * * *